UNITED STATES PATENT OFFICE.

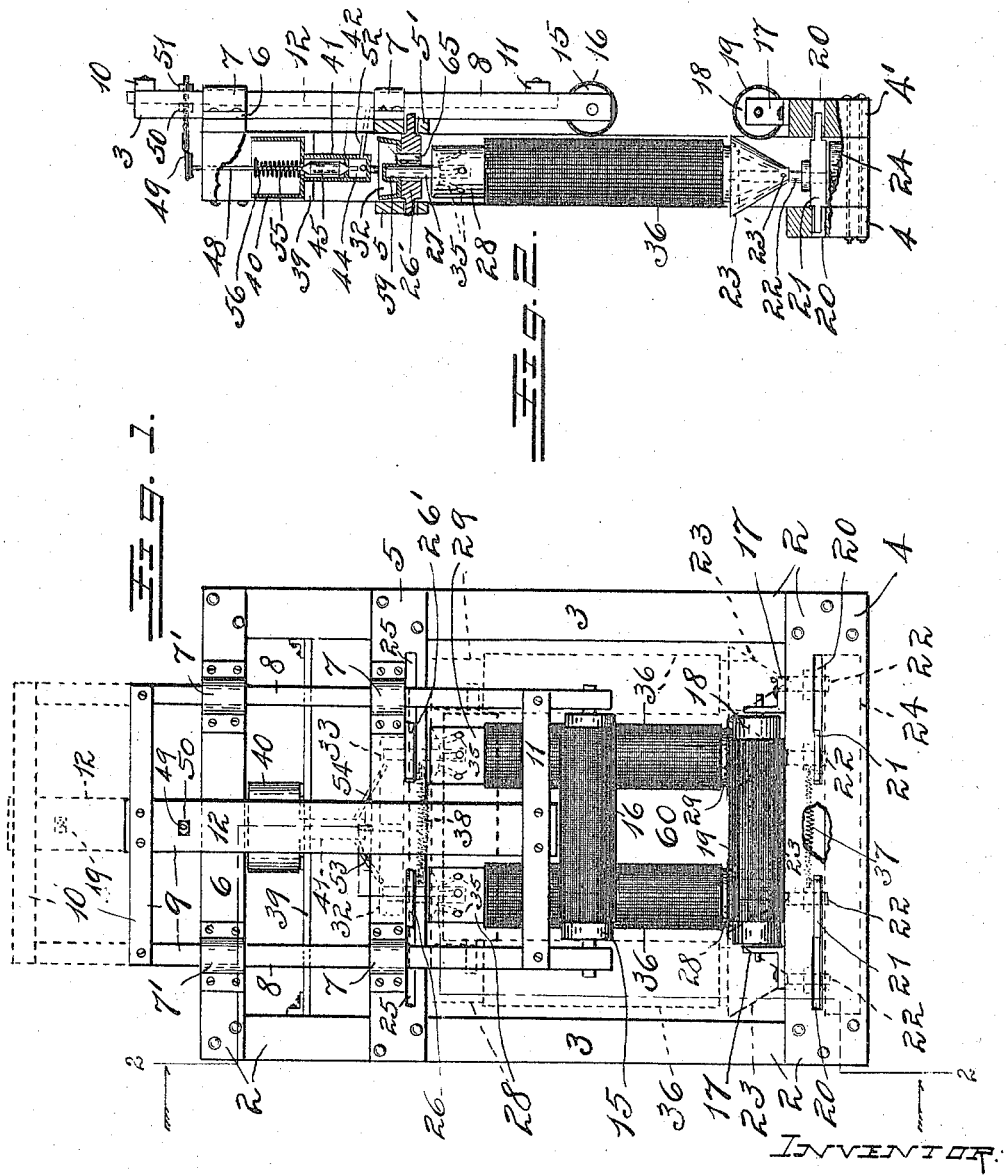

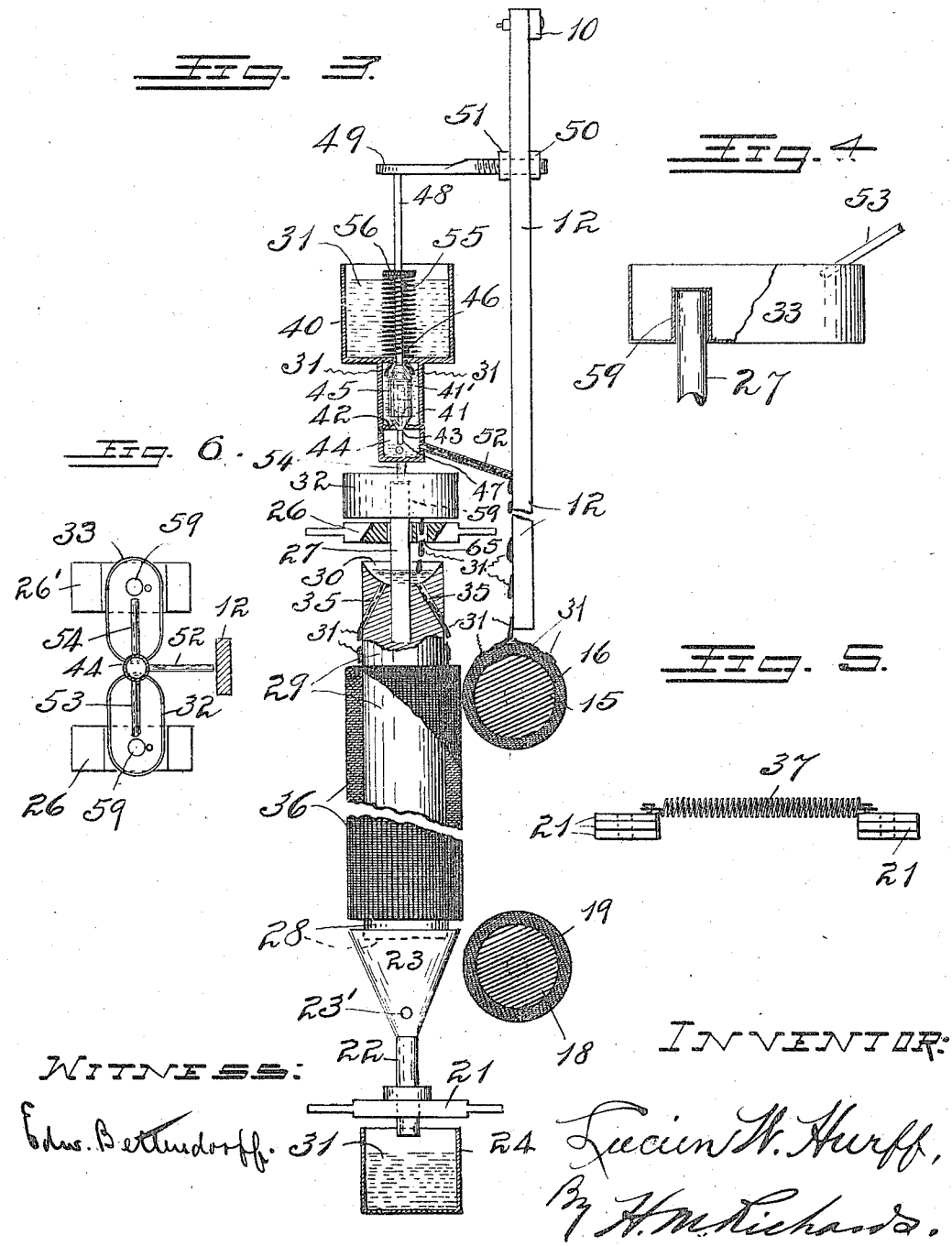

LUCIEN W. HURFF, OF GALESBURG, ILLINOIS.

ANIMAL-OILER.

1,237,784.

Specification of Letters Patent.

Patented Aug. 21, 1917.

Application filed March 20, 1916. Serial No. 85,394.

*To all whom it may concern:*

Be it known that I, LUCIEN W. HURFF, a citizen of the United States, and a resident of Galesburg, in the county of Knox and State of Illinois, have invented a new and useful Animal-Oiler, of which the following is a specification.

My invention, while primarily intended for the purpose of applying oil to hogs, is equally as well adapted for use in applying parasite and vermin-destroying liquids to sheep and other animals.

Heretofore devices of this character have been so constructed that the animal was compelled in order to rub against the liquid-applying device, to discover the location thereof, and he was supposed to recall it whenever the vermin were worrying him. This, it is needless to say, was beyond the mental capacity of a swine, and the result was that he was not regularly or with sufficient frequency treated. One of the main objects of my invention is to overcome this defect, and this I efficiently accomplish by providing a gate-like structure adapted to be set either temporarily or permanently in a doorway, a pen-entry, a feed-lot, an opening in a fence, or in any other suitable position, through which structure the animal may voluntarily pass or may be driven, and as often as desired, the liquid being automatically applied as he passes through, from either the front or the back.

Another object is to provide a device which will apply the liquid to practically every portion of the animal.

It is a special object to provide a device by means of which an entire drove of hogs may be treated within a very brief space of time.

It is an additional object to provide an absorbent roller-cover which is in the nature of a reservoir from which the oil will be pressed as the animal bears against it.

Another object is to provide a device which will be extremely economical in the use of oil, in that the animal will not stand at and rub against a valve-actuating plate for a considerable length of time, thereby discharging repeated quantities, practically all of which is wasted.

A further object is to provide a device which will apply the liquid as effectively to small pigs as to large hogs.

A still further object is to provide a device most of the oil-applying elements of which are yieldingly arranged, whereby danger of injury to an animal passing through it is averted.

Still another object is to provide novel structural features and combinations of elements.

Numerous other objects will presently appear. Some of these will be particularly pointed out and others obvious.

In view of the foregoing it may be said that the principal end and object of the invention is to generally improve the construction and increase the capacity, utility and efficiency of devices of this character.

By way of example a device constructed according to and illustrating a preferred embodiment of the invention is illustrated in the accompanying drawing, in which:

Figure 1 is a front elevation, the full lines indicating the parts in normal positions and the dotted lines indicating some of the positions they assume in operation;

Fig. 2, a vertical section, taken substantially in the plane of the line 2—2 in Fig. 1;

Fig. 3, an enlarged vertical section;

Fig. 4, an enlarged detail of one of the movable oil-pans;

Fig. 5, an enlarged detail of one of the means for returning the perpendicularly arranged roller to normal positions; and Fig. 6, a horizontal section in the line 6—6 in Fig. 1.

Considering the drawings in detail, 2 indicates a frame comprising uprights 3 to which are secured base-plates 4, 4', intermediate plates, 5, 5', and a top plate 6. 7, 7' denote guides secured respectively to the front plates 5 and 6. Reciprocably mounted in these guides are the side-bars 8 of a roller-carrying and valve-actuating frame 9 which includes also upper and lower transverse bars 10 and 11 respectively. 12 designates an oil-carrying plate. Mounted in bearings in the lower ends of the bars 8 is a roller 15 which is provided with an absorbent covering 16.

Mounted in bearings in brackets 17 secured to the plate 4 is a roller 18 which is rotatable but otherwise stationary and which has an absorbent covering 19.

Slidably seated in registering slots 20 in the plates 4 and 4' are the ends of funnel-carrying plates 21 each of which is pierced by a shaft 22 which supports a funnel 23. 24 indicates a drip-pan.

Slidably seated in registering slots 25 in the plates 5 and 5' are the ends of oil-cup-moving plates 26, 26' each of which is pierced by a gudgeon 27 projecting each from the upper end of a roller 28, 29, the lower ends of which rollers project slightly into the adjacent funnels 23. The top of each roller is cupped as shown best at 30, Fig. 3, whereby to receive the oil 31 coming from the tube of an individual oil-cup 32, 33, each of which has in its bottom a pocket 59 which receives the terminal of a gudgeon 27, and leading from each cup 30 to the periphery of each roller is a series of openings 35, shown best in Fig. 3. Each roller, 29 and 30, is provided with an absorbent cover 36.

37 indicates a contractile spring connecting the plates 21, and 38 a like spring connecting the plates 26, 26'.

Supported on a cross-plate 39 is a supply tank 40 having in its bottom a centrally arranged opening 46 which communicates with a valve-casing 41 having a cross-partition 42 provided in its bottom with an opening 43, the partition, the continuation of the casing walls, and the bottom of the casing providing a compartment 44 just sufficient in size to hold the quantity of oil which it is desired to be discharged at each reciprocatory movement of a valve or cut-off 45 the conical head of which closes the opening 46 and the conical foot of which closes the opening 43. 47 designates a valve-guide reciprocable in the opening 43, and 48 indicates a valve-guide reciprocable in the opening 46 and extending upward through the tank 40. A plate 49 is secured by nuts 50, 51 to the oil-carrying plate 12. The compartment 44 is provided with openings communicating with pipes 52, 53 and 54 discharging respectively onto the plate 12 and into the movable oil-cups 32 and 33. 55 indicates a compressed or expansion spring embracing the valve-guide 48, its lower end resting on the bottom of the tank 40 and its upper end against a collar 56 fixed on the said guide 48.

In operation, the frame 2 is placed between a pair of fixed objects, as the sides of a door-casing, which support it. The animals are then either driven or allowed to go at will toward it. Seeing the opening or outlet 60, provided by four rollers, they will attempt to pass therethrough and in so doing each one will come in contact with all four rollers. If it be a medium or large sized animal his sides will spread the rollers 28—29 relatively to each other, and his back will elevate the roller 15 to thereby raise the frame 9, thereby raising the plate 49 and permitting the spring 55 to expand and raise the cut-off 45, thereby closing the opening 46 and opening the outlet 43. The oil will thus be closed off between the tank 40 and the upper compartment 41' of the casing 41, and simultaneously the oil will flow from said compartment 41' to the compartment 44 from whence it will flow into the tubes 52, 53 and 54 and thence against the plate 12 and into the cups 32, 33. Each of these cups has in its bottom an opening 64, each of which openings registers with an opening 65 in the adjacent plates 26, 26'. The oil will drip through these openings and into the cups 30 and thence flow through the passages 35 onto the surfaces of the rollers 28 and 29 and thus saturate the coverings 36. Simultaneously with the foregoing operations oil will flow through the tube 52 onto the plate 12, from which it will trickle onto the covering 16 of the roller 15. Any drip from this roller will fall onto the covering 19 of the roller 18, and any drip from the rollers 28 and 29 will trickle into the funnels 23 and out of the openings 23' therein into the removable drip-pan 24.

As the animal spreads the rollers 29 and 30 apart their gudgeons 22 carry with them the funnels 23 and the plates 21, expanding the spring 37. Simultaneously the gudgeons 27 move the plates 26 and 26', thus expanding the spring 38. As soon as the animal has passed through the opening 60 the springs 37 and 38 will contract and return said moved parts to their normal positions, and the frame 9 will fall by gravity and cause the cut-off 45 to move away from and open the aperture 46 and simultaneously close the aperture 43, thus allowing the compartment 41' to fill with oil. It will be noted that either the upper or the lower end of either roller 28 or 29 may move independently of the other, and that either of the rollers 15, 28 or 29 may be moved independently. The roller 18 will apply oil to the chins, bellies and legs of the animals as they pass thereover, and each of the other rollers is held yieldingly against his body, practically every portion of which will thus be oiled.

One of the preferred places in which to place the device is at the entrance to the feed-lot, for the habit of the animals is to pass frequently in and out thereof, and it will be seen that if the opening 60 be the only opening visible to them they will soon seek it and thus frequently apply the oil to their bodies.

The particular material from which the absorbent roller-covers are made is immaterial. However, I prefer that it be of such nature that it acts as a reservoir which will retain a considerable quantity of oil, a portion of which will be pressed therefrom as the animal bears against the absorbent; and I prefer that the absorbent proper have a retainer or binder which is of any mesh material through which the oil will readily exude, such as that shown. And while I much prefer to employ rollers, it will be evident that substitute elements which do not turn upon their axes, might be employed.

Particular stress may be laid upon the fact that inasmuch as the roller-coverings 16 and 36 are yielding, and that the rollers which carry them are yieldingly mounted, the coverings will as they roll correspond to the undulations and curves of the body of the animal and that the liquid will therefore be applied with great efficiency. For the purposes of this specification, inasmuch as the several roller-coverings are merely means for holding the oil on the rollers they may be considered each as a part of the roller which it surrounds. It is to be understood, however, that it is not an essential part thereof except in those claims in which it is specifically recited.

It is desirable that the oppositely arranged rollers be constantly spaced apart, in order that the animal may clearly see an opening through which he may pass.

That numerous changes may be made in the arrangement, the organization, and the constructive details without departing materially from the spirit of the invention, will be apparent; therefore I do not intend to limit myself to the specific form herein shown and described except as definitely pointed out in the following claims, in which claims it is my intention to claim all the novelty in the invention as broadly as is permitted by the state of the art.

I claim as new the following to-wit:

1. In a device of the nature described, a roller, means for mounting one of its ends to slide laterally, and an oil-cup adapted to supply liquid to said roller and to be moved simultaneously therewith.

2. In a device of the nature described, a roller, means for mounting one of its ends to slide laterally, means for supplying liquid to said roller, and a cup adapted to be moved simultaneously with the roller and to catch the drip therefrom.

3. In a device of the nature described, a tank, a valve casing communicating therewith and provided with an apertured partition dividing it into an upper and a lower compartment, a spring-pressed cut-off in the upper compartment, adapted to hold normally opened the means of communication between it and the tank and to close the aperture in the partition, a reciprocable frame, an element carried thereby adapted to move to permit said cut-off to move from its normal position, and a plurality of rollers to which said lower compartment supplies liquid.

4. In a device of the nature described, a roller having its top cupped and having passages through its body, running from the cup diagonally downward to the surface of the roller, a source of liquid supply, and an absorbent covering on the roller, to which said passages are adapted to supply liquid.

5. In an animal-oiler, and in combination, a vertically reciprocable roller, laterally reciprocable rollers spaced from each other, a single source of liquid-supply common to all of said rollers, and a cut-off operated by the rising movement of the first recited roller.

6. In an animal-oiler, and in combination, a lower horizontally arranged roller, an upper horizontally arranged roller adapted to rise and fall vertically, a pair of vertically arranged rollers spaced apart and adapted to be moved by an animal in a straight line away from each other, means for returning them to normal positions, and means actuated by the displacement of one of said rollers for supplying all the rollers with liquid.

7. In an animal-oiler, and in combination, a lower horizontally arranged roller, an upper horizontally arranged roller adapted to rise and fall vertically, a pair of vertically arranged rollers spaced apart and adapted to move in a straight line toward and from each other, contractile springs connecting them, and means actuated by the sidewise displacement of one of said rollers for supplying the upper and vertically arranged rollers with liquid.

8. Combined in an animal-oiler, vertically arranged rollers adapted to move lineally toward and from each other, an individual liquid-cup for each roller, and a supply tank for furnishing liquid to both cups.

9. In combination, vertically arranged, yieldingly mounted parallel rollers, a horizontally arranged reciprocating roller, a tank for supplying said rollers with liquid, and a valve communicating with said tank and adapted for actuation by reason of the sidewise movement of one of said rollers, the valve-actuating roller adapted to be actuated by an animal bearing against and approaching it from its front or rear.

10. In combination, vertically arranged, yieldingly mounted parallel rollers, a horizontally arranged reciprocating roller, a tank for supplying said rollers with liquid, and a valve communicating with said tank, adapted to supply liquid to said rollers and adapted to be actuated by reason of the sidewise movement of one of the rollers.

11. In combination, a vertically reciprocating roller, vertically arranged rollers spaced from each other and adapted to be forced apart by an animal passing between them, means for returning them to normal positions after the passage of an animal, a source of liquid supply, and a valve in communication with said source, operable by reason of the sidewise movement of one of the said rollers and adapted to supply liquid to said rollers.

12. In an animal oiler, and in combination, a vertically reciprocable roller, laterally reciprocable rollers spaced from each other, a source of liquid supply common to all of said rollers, and a cut-off operated by the sidewise movement of one of said rollers.

13. In an animal-oiler, and in combination, a frame, oppositely arranged rollers mounted therein, spaced constantly from each other and adapted to move in a straight line toward and from each other and to be moved apart by an animate object passing between them, and a source of oil-supply for said rollers.

14. In an animal-oiler, and in combination, a frame, oppositely arranged rollers arranged therein, spaced constantly from each other and adapted to move in a straight line toward and from each other and to be moved apart by an animate object passing between them, a source of oil-supply for said rollers, and means for retaining the oil on their cylindrical surfaces.

15. In an animal-oiler, and in combination, a frame, oppositely arranged rollers mounted therein, spaced constantly from each other and adapted to move in a straight line toward and from each other, said rollers adapted to be spaced apart by reason of an animal passing between them, means for returning them to their normal positions, and means for supplying them with oil.

16. In an animal oiler, a frame, oppositely arranged rollers mounted therein, spaced constantly from each other and adapted to be moved away from each other, in a direct line, by reason of an animal passing between them, and means for supplying them with oil.

17. In an animal-oiler, and in combination, a frame, rollers mounted therein, spaced constantly from each other and adapted to be moved away from each other, in a direct line, by reason of an animal passing between them, means for returning them to normal positions after the animal has passed, and means for supplying them with oil.

18. In an animal-oiler, and in combination, a frame, oppositely arranged oil-applying elements mounted therein, spaced constantly from each other and adapted to be moved away from each other, in a direct line, by reason of an animal passing between them, means for returning them to normal positions, after the animal has passed, and means for supplying them with oil.

19. In an animal-oiler, and in combination, a frame, rollers mounted therein, spaced constantly from each other and adapted to be moved away from each other, in a direct line, by reason of an animal approaching from either front or back and passing between them, means for returning them to normal positions after the animal has passed, and means for supplying them with oil.

20. In an animal-oiler, a frame, oppositely arranged rollers between which there is constantly a visual opening throughout their lengths, each roller adapted to move toward and from the other in a direct line and said rollers adapted to be moved from each other by an animate object passing between them, and a source of oil-supply for the rollers.

21. In an animal-oiler, a frame, oppositely arranged rollers therein, said rollers adapted to be moved from each other by an animate object passing between them, oil-retaining covers arranged one on each roller, each of said rollers adapted to move toward and from the other in a direct line and said covers constantly spaced from each other, and a source of oil-supply for said covers.

In testimony whereof I hereunto subscribe my name this sixteenth day of March, 1916, at Galesburg, Illinois.

LUCIEN W. HURFF.

Copies of this patent may be obtained for five cents each, by addressing the "Commissioner of Patents, Washington, D. C."